E. J. KNOWLTON.
Cutt-Offs and Strainers for Cistern-Pipes.
No. 152,652. Patented June 30, 1874.

WITNESSES:
W. W. Dodge
T. C. Smith

INVENTOR:
E. J. Knowlton
by Dodge & Son
Attys.

N. PETERS, PHOTO-LITHOGRAPHER, WASHINGTON, D. C.

UNITED STATES PATENT OFFICE.

ERNEST J. KNOWLTON, OF ANN ARBOR, MICHIGAN.

IMPROVEMENT IN CUT-OFFS AND STRAINERS FOR CISTERN-PIPES.

Specification forming part of Letters Patent No. 152,652, dated June 30, 1874; application filed October 17, 1873.

*To all whom it may concern:*

Be it known that I, ERNEST JOHN KNOWLTON, of Ann Arbor, in the county of Washtenaw and State of Michigan, have invented certain Improvements in Cistern-Pipes, Cut-Offs, and Strainers, of which the following is a specification:

My invention consists in a novel construction of a strainer for rain-spouts, and in the combination of a cut-off therewith, as hereinafter explained.

Figure 1:
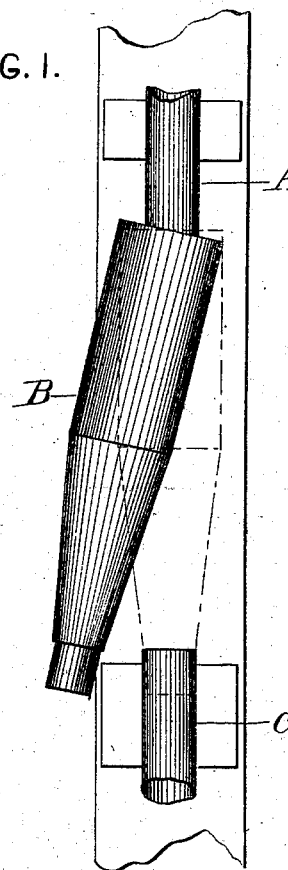
Figure 3:
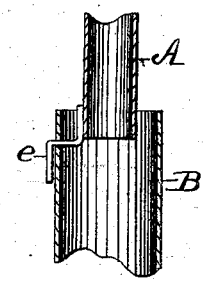
Figure 2:
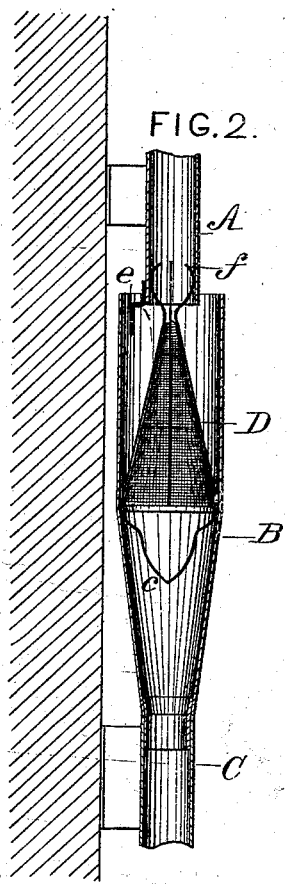
Figure 4:
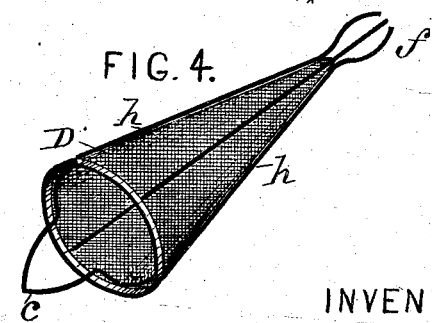

Figure 1 is a front elevation, showing the cut-off in operation. Fig. 2 is a longitudinal or vertical section, showing the strainer in position, with the cut-off arranged to connect with the pipe below. Figs. 3 and 4 are views of portions shown more in detail.

In constructing my cut-off, I provide a section, B, of the rain-spout, which is much enlarged in diameter, as shown in Figs. 1 and 2, with its lower portion made conical, with its extreme lower end of a size to fit snugly into the open end of the stationary pipe C below, as shown in Fig. 2. Upon the lower end of the upper pipe A, I secure a wire hook, $e$, of the form shown in Fig. 3; and I make one or more corresponding holes through the side of the cut-off B, near its upper end, so that when it is desired to arrange the cut-off so as to cut off the flow of the water from the cistern or the pipe below it is raised up far enough to disconnect the lower end from the pipe C, and then the hook or bent wire $e$ is inserted in the hole at the upper end of the part B, which is then left hanging in the position shown in Fig. 1, the manner of its suspension being represented in Fig. 3. When thus arranged it is obvious that the water from the pipe A will enter the cut-off B, and from thence pass off at one side. It is obvious that any form of hook or device may be used instead of the hook $e$, so long as it will permit the cut-off B to be raised up to disconnect it from the pipe below and hold it suspended after it has been disconnected.

To make an effective strainer, I take wire-gauze and cut it of such a form that when its edges are united it will make an elongated cone, as represented in Figs. 2 and 4. In order to render it still more efficient as a strainer and to keep it in shape, I extend from top to bottom a series of wires, $h$, both inside and out, these wires thus forming bars or fenders, which not only stiffen it, but which also prevent the leaves and other material that will accumulate within or upon it from being packed so closely upon the gauze as to prevent the passage of the water. The object of thus arranging the wires $h$ both inside and out is to permit the strainer to be used either end up, though I prefer to use it, as represented in Fig. 2, with its smaller end uppermost. From the apex of the strainer D I arrange four or more wires, $f$, which may be simply a continuation of the wires $h$, and curve their upper ends, as represented in Fig. 2, by which they form a series of spring-arms that can be easily shoved into the pipe above, and which, when thus arranged, will hold the strainer in a vertical position within the cut-off or section B. To the larger end of the strainer D I attach a bent wire, $c$, as shown in Figs. 2 and 4, which serves as a bail, by which it can be readily lifted out when inserted with its large or open end uppermost.

The construction of the parts is such that the cut-off and strainer may be made as an article of trade, and be easily applied to any ordinary spout by simply cutting out the required length and applying the hook, which in such case may be attached to the part B, so as to hook into a hole in the pipe above.

Having thus described my invention, what I claim is—

1. A strainer for rain-spouts, consisting of an elongated cone of wire-gauze, having the wires or fenders $h$ secured vertically to its sides, substantially as shown and described.

2. The combined cut-off and strainer, consisting of the enlarged and detachable tube B and the reversible strainer D, all constructed for joint operation, substantially as shown and described.

ERNEST JOHN KNOWLTON.

Witnesses:
 STEPHEN H. SECKNER,
 ZINA P. KING.